United States Patent
Sudhakar et al.

[11] Patent Number: 6,055,482
[45] Date of Patent: Apr. 25, 2000

[54] METHOD OF SEISMIC SIGNAL PROCESSING

[75] Inventors: Vasudhaven Sudhakar, Calgary, Canada; Robert S. Stephens, Garland, Tex.

[73] Assignee: Coherence Technology Company, Inc., Houston, Tex.

[21] Appl. No.: 09/169,403

[22] Filed: Oct. 9, 1998

[51] Int. Cl.$^7$ .................................................. G06F 19/00
[52] U.S. Cl. .......................................................... 702/16
[58] Field of Search ................................. 702/14, 16, 17, 702/18; 367/72, 73

[56] References Cited

U.S. PATENT DOCUMENTS

| | | |
|---|---|---|
| 5,226,019 | 7/1993 | Bahorich . |
| 5,563,949 | 10/1996 | Bahorich et al. . |
| 5,724,309 | 3/1998 | Higgs et al. . |

FOREIGN PATENT DOCUMENTS

| | | |
|---|---|---|
| WO96/18915 | 6/1996 | WIPO . |
| WO97/33183 | 9/1997 | WIPO . |
| WO97/33184 | 9/1997 | WIPO . |

*Primary Examiner*—Donald E. McElheny, Jr.
*Attorney, Agent, or Firm*—Browning Bushman

[57] ABSTRACT

A method of seismic analysis is disclosed for identifying subterranean features that in one embodiment uses a coherence analysis for improved seismic data interpretation such as improved accuracy of variables for use in velocity models. The method may be used while analyzing seismic data to produce an earth model wherein the analysis is preferably applied at each level for the model. In another embodiment of the present invention, the coherence analysis is applied as a function of the seismic processing sequence to improve the variables associated therewith. With respect to a subterranean location of interest, azimuth ordered gathers may be used to identify subterranean features such as fault/fracture patterns. In another embodiment, offset ordered coherence analysis is used to form an optimum stack at the subterranean location of interest. In another embodiment of the invention, factors such as P, S, G, and fluid factor are derived from coherence data from which instantaneous envelope gathers are computed and divided into angle gathers.

46 Claims, 4 Drawing Sheets

METHOD OF SEISMIC SIGNAL PROCESSING

BACKGROUND OF THE INVENTION

1 Field of the Invention

The present invention relates generally to seismic signal processing and, more particularly, to apparatus and methods for improved interpretation of seismic data including seismic data related to identification of stratigraphic and lithological features.

2 Description of the Background

To locate valuable hydrocarbon deposits, numerous techniques have been developed for transmitting seismic wave energy into the earth's subterranean formations, recording the reflected seismic wave energy, and processing the recorded data. Analysis of 3-D seismic data is now used extensively worldwide to provide a detailed structural image of subsurface reservoirs. A typical 3-D arrangement may use hundreds of receivers arranged in a patched manner with the lines of receivers being orthogonal to the shot line direction. The reflected seismic wave energy is detected using sensors such as geophones or hydrophones and processed to produce signals or traces that have numerous properties related to the seismic wave energy, such as frequency, amplitude, phase, instantaneous envelope, and the like.

To process, as well as to improve, the quality of the recorded signals, various techniques are used, such as geometry selection, selection of common depth point gathers, wavelet shaping, velocity analysis—i.e., a series of steps before final migration puts the earth's geological boundaries at their correct position. Each of these steps involves making assumptions that may not result in optimal clarity of the final result generally due to unknown factors of the earth's subterranean features. For instance, the step of migration may involve making assumptions about velocity modeling techniques where the actual velocity in the relevant portion of the earth's volume may not be precisely known due to various or complex subterranean features.

During one part of the processing sequence, traces are typically added after time shifting so as to be stacked upon each other at common earth x, y positions in a manner that is aimed to provide a more reliable signal by reinforcing the information in the signal and reducing the random noise that tends to average out. In other words, the information in the traces tends to be reinforced as more traces are added together or stacked. Likewise, random noise such as surface noise and the like tends to be averaged out, as the same random noise will not typically be present at each sensor. Thus, as is well known to those of ordinary skill in the art, a seismic trace corresponding to a particular subsurface location is typically a composite trace resulting from stacking of numerous traces corresponding to that subsurface location and produced by detection of seismic waves by receivers having that subsurface location as their common depth point. The improved data is then used to identify and characterize geology and lithology of subsurface formations. However, in some cases noise may still be present in the stacked data that detracts from the geological information in the data.

Until recently, interpretation of such information has generally overlooked effective evaluation of seismic discontinuities, correlations, and differences—i.e., the coherence between the stacked seismic data signal traces. The overall effect of recognizing the advantages of the latter approach to interpretation is a greatly improved method for detecting important geological constituents such as faults, fractures, and subtle subterranean features.

Coherence analysis is discussed in U.S. Pat. No. 5,563,949, issued Oct. 8, 1996, to Bahorich et al., which is hereby incorporated herein by reference, wherein a method is disclosed for the exploration of hydrocarbons. The method as described in more detail in U.S. Pat. No. 5,563,949, and referred to hereinafter as coherence analysis, typically comprises such steps as obtaining a set of seismic signal traces distributed over a predetermined three-dimensional volume of the earth, dividing the three dimensional volume into a plurality of vertically stacked and generally spaced-apart horizontal slices, dividing each of the slices into a plurality of cells having portions of at least three seismic traces located therein, measuring the cross-correlation between another pair of traces lying in another vertical plane to obtain a cross-line value, and combining the in-line value and the cross-line value to obtain one coherency value for each of the cells and displaying the coherency values.

See also WO 97/33184, published Sep. 12, 1997, to Higgs et al., which discloses a method for identifying faults and stratigraphic features within seismic data without interpreter bias by processing data to identify the minimum difference between seismic traces. Large values of difference are plotted as display attributes for seismic reflection data interpretation for two-dimensional and three-dimensional seismic data. The large values of difference represent faults and stratigraphic features within the seismic data. Dip azimuth and dip magnitude attributes can also be generated and displayed.

Another patent, U.S. Pat. No. 5,724,309, issued Mar. 3, 1998, to Higgs et al., discloses a method for utilizing instantaneous phase and derivatives of instantaneous phase as display and/or plot attributes for seismic reflection data processing and interpretation for two-dimensional and three-dimensional seismic data. The spatial frequency, dip magnitude, and dip azimuth attributes of the seismic events are calculated using the rate of change of instantaneous phase with space, instantaneous frequency and velocity, and displayed or plotted to assist interpreters in identifying fault breaks and stratigraphic features in the earth's subsurface.

Very generally, coherence analysis has involved comparing each trace or portion of a trace with adjacent traces, preferably in two different directions, and determining how well the traces correlate with each other. This correlation, similarity/dissimilarity, difference is preferably referred to herein as "the coherence." The coherence between traces may be determined in numerous different ways, such as those discussed in the above-cited references. If significant changes are found between traces or portions of traces—i.e., low coherence—then it is likely that a subsurface feature that included sharp changes such as a fault or fracture produced this change. The coherence is itself then used as a trace and is plotted so that analysis may be visually made. While coherence analysis has provided a great improvement in the ability to identify faults and lithographic features, it has been found that many faults, fractures, and the like still remain unidentified or missed for reasons that may often be due to complex subterranean effects including structural effects and fluids within the formations and/or various non-optimal steps in the processing sequence. Consequently, there remains a need for an improved method of seismic signal research that increases the likelihood of selection of optimal variables and, when using a coherence analysis, increases the likelihood of detecting relevant subterranean features. There is also a need to reduce noise in stacked data. Those skilled in the art have long sought and will appreciate the present invention, which addresses these and other problems.

SUMMARY OF THE INVENTION

In one embodiment of the present invention, a method of seismic analysis for identifying subterranean features is provided for improvements in accuracy in developing an earth model. The method includes obtaining seismic data, such as 3D seismic data, that includes data representative of a first subterranean location of interest that is preferably to be the first level of the model. A plurality of migrated gathers related to the first subterranean location of interest are iteratively produced such that each of the plurality of migrated gathers varies with respect to a first variable whose value is to be optimized. A respective set of coherence information for each of the plurality of migrated gathers is produced. The respective set of coherence information for each of the plurality of migrated gathers is then compared for determining an optimal value of the first variable. In one presently preferred embodiment, the variable may be related to a velocity of a seismic wave.

Each of the plurality of migrated gathers includes a respective plurality of traces related to the first subterranean location of interest. The respective plurality of traces for each of the plurality of migrated gathers is compared for producing the respective set of coherence information for each of the plurality of migrated gathers. More specifically, for each of the plurality of traces, a plurality of first traces is preferably compared to a plurality of second traces and third traces. The plurality of second traces is positioned in a first direction from the first traces, and the plurality of third traces is positioned in a second direction different from the first direction. From the comparison of the plurality of first traces to the plurality of second traces and the plurality of third traces, a set of respective coherence information is produced—e.g., a plurality of coherence traces.

The earth model is preferably built by proceeding layer by layer from shallow to deep. The first subterranean location of interest is a shallow layer. A second subterranean location of interest is selected that comprises a deeper layer of the earth model than the first subterranean location of interest. A second plurality of migrated gathers related to the second subterranean location of interest is iteratively produced such that each of the second plurality of migrated gathers varies with respect to at least one second variable. A respective second coherence analysis is made for each respective plurality of traces of each of the second plurality of migrated gathers. The respective second coherence analysis for each of the second plurality of migrated gathers is made for determining the at least one second variable. The process continues from layer to deeper layer in a similar manner.

In another embodiment, a plurality of gathers is obtained such that each of the plurality of gathers includes a respective plurality of traces related to the subterranean location of interest. Each of the plurality of gathers is unique in that each of the plurality of gathers includes a combination for the plurality of traces not found in any other of the plurality of gathers. Each of the plurality of gathers has an ordered relationship with respect to the subterranean location of interest. A respective set of ordered coherence information is produced from each of the plurality of gathers such that each respective set of ordered coherence information has the same ordered relationship with respect to the subterranean location of interest. A comparison of each of the respective sets of coherence information is then made.

In one embodiment, at least one migrated gather is obtained that is related to the subterranean location of interest. A set of coherence information is produced from the at least one migrated gather, and a plurality of instantaneous envelope gathers is produced from the set of coherence information. The instantaneous envelope gathers are divided into instantaneous envelope gathers ordered by their angle with respect to the common subterranean location of interest. The migrated gather is preferably a prestack migrated gather that is flattened at the subterranean location of interest. To confirm accurate flattening, residual normal moveout corrections are applied to the migrated gather to ensure that a characteristic peak, trough, or zero crossing is flattened accurately at the subterranean location of interest. The computing of instantaneous envelope is preferably made along common offset planes. From the angle-ordered instantaneous envelope gathers, at least one of the compressional wave, shear wave, rate of change of amplitude, or fluid factor is determined from the instantaneous envelope gathers ordered by angle as the subterranean location of interest.

In another embodiment, a plurality of azimuth-ordered gathers are produced with respect to the subterranean location of interest such that the plurality of gathers is representative of a respective plurality of volumes ordered in azimuthal distribution with respect to the subterranean location of interest, each plurality of azimuth gathers including a respective plurality of traces. A respective set of azimuth-ordered coherence information for each of the plurality of azimuth-ordered gathers is produced. The respective plurality of coherence information is compared for each of the plurality of azimuth-ordered gathers. For instance, the respective set of azimuth-ordered coherence information for each of the plurality of azimuth-ordered gathers may be plotted to produce azimuth-ordered coherence plots, and then the azimuth-ordered coherence plots are compared with each other such as with computer animation techniques. In this process an apparent fault/fracture from one set of azimuth-ordered coherence information having a first azimuth may be compared to the apparent fault/fracture with a second set of azimuth-ordered coherence information. Since the fault/fracture may tend to disappear if viewed from an orthogonal position, the second set of azimuth-ordered coherence information may preferably be selected to have a second azimuth in a range of azimuth angles including an azimuth angle at an approximate right angle with respect to the first azimuth. It may be more convenient to locate the apparent fault/fracture from one set of azimuth-ordered coherence information having a first a first range of azimuths and then compare the apparent fault/fracture with a second set of azimuth-ordered coherence information having a second range of azimuths.

Another embodiment may be used to optimize the selected migrated gather. For this purpose, migrated gathers are divided into a plurality of angle of incidence gathers such that the angle of incidence gathers are ordered with respect to an angle of incidence with the subterranean location of interest. A respective set of angle of incidence-ordered coherence information is produced for each of the plurality of angle of incidence gathers, and the respective sets of angle of incidence-ordered coherence information are compared for each of the plurality of angle of incidence gathers. The migrated gathers are preferably time migrated gathers.

In another embodiment during the processing of the seismic data where it is desired to optimize variables or selections during the processing sequence, a plurality of geometry-assigned gathers related to the common subterranean location of interest are optionally produced and a respective set of geometry assignment coherence information for each of the plurality of geometry assigned gathers so as to optimize the geometry assignment. A plurality of wavelet-shaped gathers may be optionally produced and a respective set of wavelet-shaped coherence information for each of the plurality of wavelet-shaped gathers produced for each so as to optimize wavelet shaping. A plurality of migrated gathers that vary with respect to a velocity variable may be optionally produced, and a respective set of migrated coherence information for each of the plurality of migrated gathers produced for selecting the optimal velocity variable.

It is an object of the present invention to provide an improved seismic analysis method.

It is another object of the present invention to provide a more accurate earth model.

It is yet another object of the present invention to use coherence analysis for optimizing seismic data variables.

An advantage of the present invention is more accurate seismic data and improved location and description of subterranean features.

These and other objects, features, and advantages of the present invention will become apparent from the drawings, the descriptions given herein, and the appended claims.

While the present invention will be described in connection with presently preferred embodiments, it will be understood that it is not intended to limit the invention to those embodiments. On the contrary, it is intended to cover all alternatives, modifications, and equivalents included within the spirit of the invention and as defined in the appended claims.

DETAILED DESCRIPTION OF THE PREFERRED EMBODIMENTS

Figure 1:
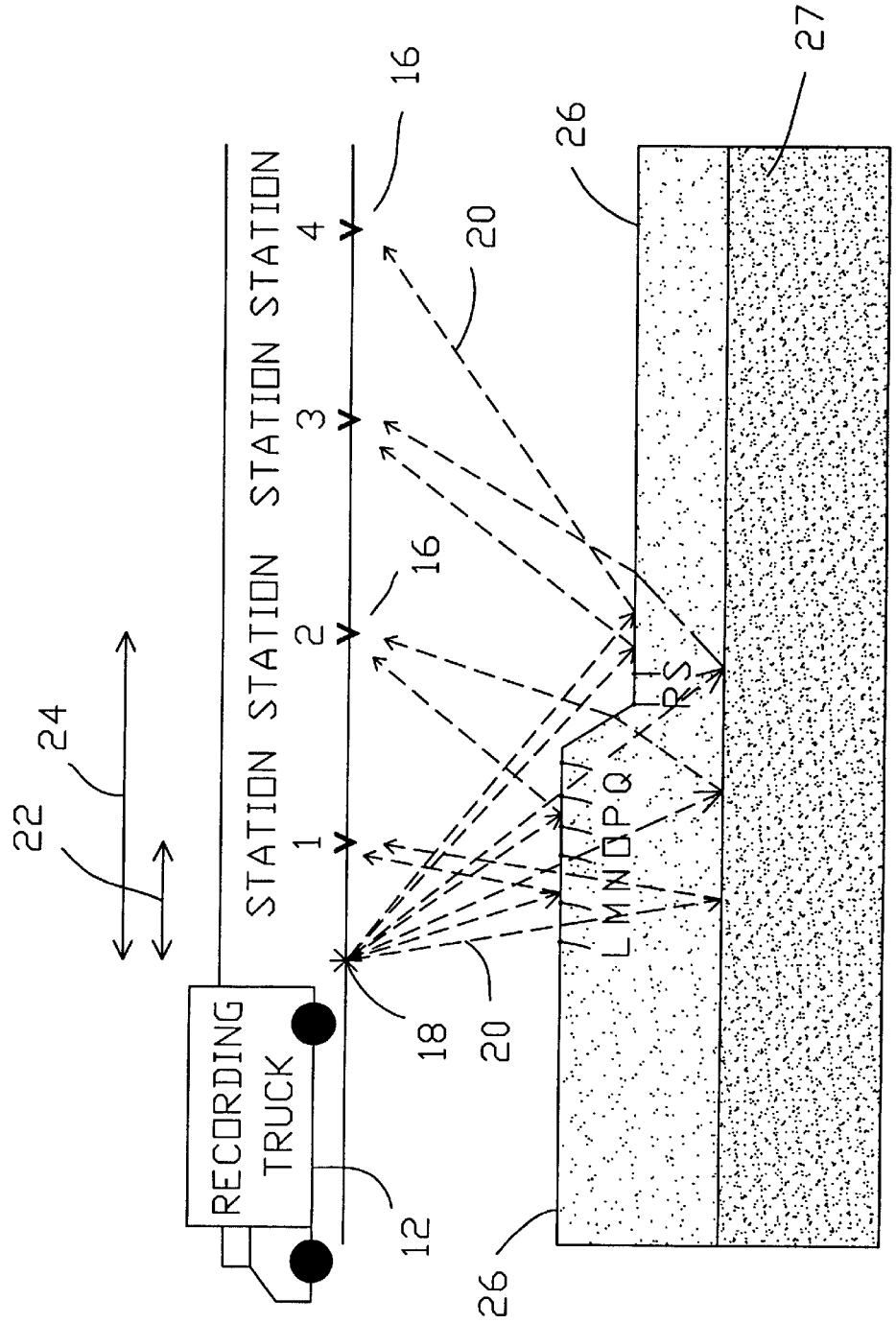
FIG. 1 is a schematical view, in section, of a view a subterranean formation and a related survey wherein functional elements for the seismic survey and the corresponding seismic waves are displayed.
Figure 2:
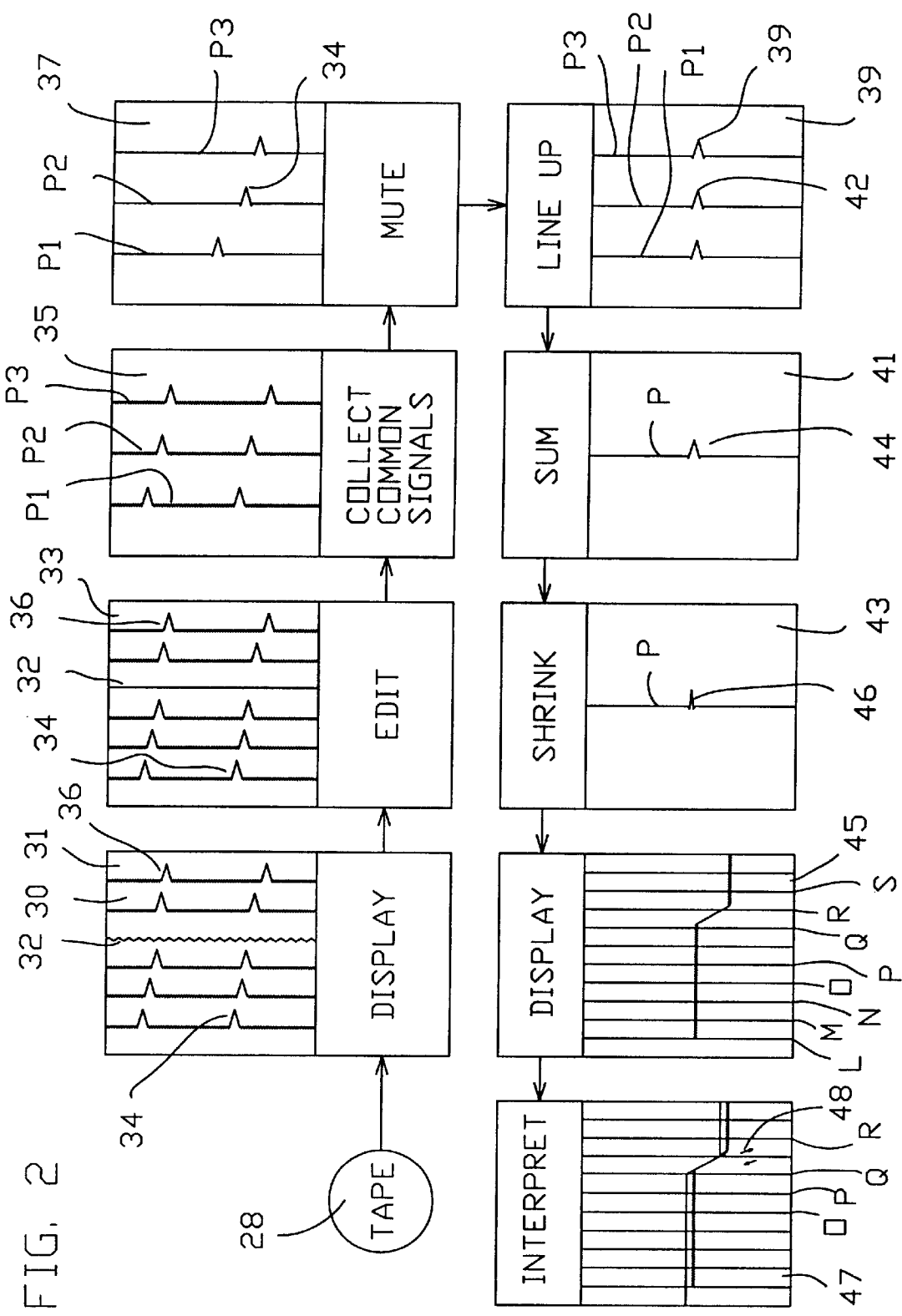
FIG. 2 is a schematical view of a related processing of seismic waves from the seismic survey of FIG. 1.

With reference now to the drawings, and more particularly to FIG. 1 and FIG. 2, there are shown figures related to some basic steps in processing of seismic data. While FIG. 1 and FIG. 2 are a views of 2D seismic data for simplicity, some of the same general principles apply to 3D data as discussed subsequently. In FIG. 1, recording truck 12 produces a seismic survey using a geophone cable connected to stations 16 wherein each station 16 includes a receiver or group of receivers. Stations 16 have respective offsets 22, 24, and so forth, with respect to source 18 in this particular shot layout. Other shot layout geometries might include a mid-line spread where source 18 is at the midpoint of the active recording line. Source 18, which may be a vibrator, air gun, explosive, or the like, generates seismic waves indicated by rays 20 that depict the trajectory of reflection energy as it propagates from source 18 to stations 16. Rays are drawn perpendicular to wavefronts. Typical exploration spreads may record over 1000 channels of data per shot. The stations may typically be moved by the same amount of offset 22 for each shot. Various factors are used to select offset 22 such as the wavelength of the surface wave so as to cancel out or reduce noise caused thereby. At regular intervals from source 18, such as offsets 22 and 24, stations 16 are positioned such that points along reflector or subterranean location of interest 26 such as point P are sampled more than once in that the rays bounce off point P at different angles representative of different source/receiver offsets. As each shot goes off, the signals from each station along the cable are recorded on magnetic tape 28 for a certain amount of time, producing a series of seismic traces that combine to produce a common shot point gather CSG 30, or group of traces produced by the same shot as indicated in frame 31 of FIG. 2, where reflections signals 34 are shown recorded with respect to time.

Although there are many variations, travel speed of sound in the earth's crust is about 6000 m/s so that one second of two-way travel time corresponds to about three kilometers' depth. In the raw data, the reflections are plotted halfway between source and the stations or receiver 16. These are referred to as unmigrated data. The process that moves the reflections in their correct spatial position is referred to as migration, and the resulting seismic section is referred to as migrated sections. Thus, data may be migrated or unmigrated.

CSG 30 is edited to correct for inoperable traces, such as trace 32 as shown in frames 31 and 33. As can be seen in frames 31 and 33, the traces show a reflection signal 34 from subterranean location of interest 26 recorded with respect to time, as well as an upper signal 36 that represents non-random noise of the surface waves produced by the shot. In frame 35, traces common to point P are combined to provide a gather of traces common to point P; thus the traces are sorted from common shot point CSG gathers to common depth point CDP gathers based on the geometry assignment. A gather generally refers to a set of traces, or all traces, bound in a common way such as to a common point, such as Point P. As discussed subsequently, each point L, M, N, 0, Q, R, S is processed, but initially we consider processing from Point P. The different traces P1, P2, and P3 have different offsets or source/receiver spacings but have the same reflection point P so that a ray such as ray 20 goes from source 18 to point P and to a respective station 16 for several different offsets. While only 3 traces P1, P2, and P3 are shown in frame 35, there may be many more especially with 3D data. In a 3D survey there will be offsets from more than one direction. The far source/receiver spacing, such as indicated by trace P3, will show a reflection signal 34 at a later time than the closer source/receiver spacing. In section 37, non-reflected arrivals such as surface waves and direct arrivals are filtered out by digital filtering or muting. In frame 39 corrections are made, such as normal move-out corrections, to correct for the amount of time each wave moves laterally to correct each trace so that the corrected reflection arrivals, such as 40 and 42, occur at the same time. Other corrections, such as to amplitude that tends to decrease further from the source, and the like may also be made. The traces P1, P2, and P3 then appear to line up or flatten as though each trace were measured at the same offset. Subsequently, as shown in frame 41, the traces P1, P2, and P3 are now added or stacked. The stacking tends to cancel out the random noise that may be particular to each station and tends to reinforce the reflected signal that is common to each station to thereby produce a signal 44 that has a higher signal-to-noise ratio. In the next frame 43, wavelet shaping such as frequency filtering and deconvolution is made in order to improve the resolution of the reflection 46 to thereby provide a sharper delineation of surface 26. The steps above are repeated for points L, M, N, 0, Q, R, and S, as indicated in frame 45. In frame 47, the display is now plotted for interpretation and analysis of geological structure of a type such that lines 48 indicate a fault along subterranean surface 28.

It will be noted that throughout this process numerous assumptions were made that may or may not be accurate. For instance, the velocity models used for determining the normal moveout may include assumptions about vertically varying velocity, ray bending, variations in lateral velocity, and the like. The process of migration actually is quite complex; and as the depths and layers and types of formation and fluids vary, the process becomes quite complex. Depth and time migration uses different assumptions for velocities for effecting migration. The step of wavelet shaping or filtering may also be subject to errors since it is not always known what features of the wavelet are caused by subterranean features. For instance, as only one example of very many possibilities where inaccuracies could arise, unconsolidated sands may decrease the signal amplitude and might be inaccurate if artificially increased by filtering. Furthermore, the geometry assignments such as offset selections and the like may not be selected optimally for the desired focusing of subterranean features. The noise may not have been optimally removed prior to stacking. Moreover, the processing sequence may need to be varied depending on the quality of the acquired 3D seismic data and the geological setting that forms the trap for hydrocarbon.

Therefore, one aspect of the present invention involves application of the coherence technique for focusing the target, such as the horizon of interest or subterranean location of interest 26. At faults or other sharp lithological changes, the coherence values tend to be quite low. Therefore, coherence can be applied at faults or other suitable subterranean structures and thereby used as an indication of focusing for the migrated volumes. Preferably, the coherence technique is applied at each stage of the processing sequence including, for instance, geometry assignment, wavelet shaping, and velocity analysis. Thus, the application uses migrated and stack cubes or volumes as input into the coherence technique, and the output or time slice is compared for focusing of the target, such as subterranean location of interest 26. In other words, the present invention uses coherence analysis as a function of the processing sequence to improve the accuracy of the final product, which involves making various selections and choices from velocity models to geometry assignments, as well as variables that may be involved therein. The characteristic of low coherence (low correlation, reduced similarity) values may be used as one indication of focusing within migrated volumes. This quality control enhances the quality of the final interpretation and also may point to steps that might cause de-focusing of the target horizon, such as subterranean location of interest 26, to occur. Even when the processing sequence may change, coherence slices or views should show focusing, in terms of low coherence at faults, when analyzed through each step of the data processing sequence. Preferably, stacked data sets are used at each stage as inputs for coherence analysis to determine whether focusing is achieved. On a coherence horizon slice, the data at the target horizon will make areas of low coherence broader and small data anomalies whose spatial nature was observed in a prior process may disappear. In one example of focusing, ancient river tracks found in a subterranean formation were focused as a function of the processing sequence, in the manner discussed hereinbefore.

Figure 3:
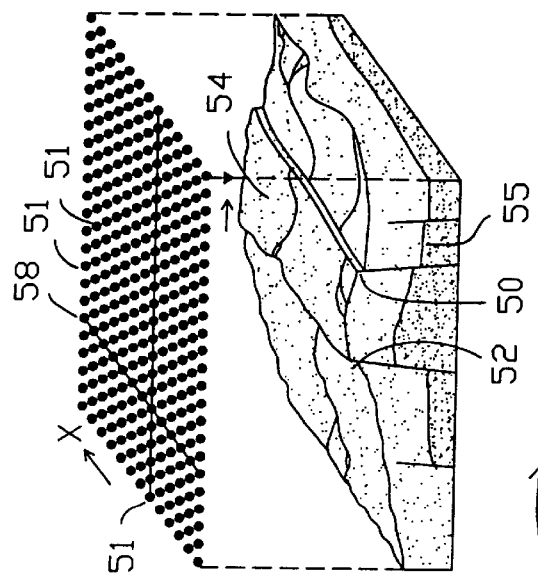
FIG. 3 is a schematical view, in section, of receivers in a 3D survey positioned over subterranean features.

As will be observed in FIG. 3, it is well known that 3D surveys have a plane of receivers, such as receiver 51, that extend in an x direction and y direction whereas 2D surveys might be represented by a receiver line such as line of receivers 58 that extends in an x direction. Thus, it will be observed that the processing sequence, although still basically similar to that discussed for a 2D survey in principle, becomes considerably more detailed to provide more definitive information. The use of the coherence technique as a function of the processing sequence of the 3D survey data provides a guide or method to enhance the quality of the seismic data final output.

FIG. 3 shows a schematic of subterranean formations where faults 50 and 52 might be selected as subterranean features useful for focusing of horizon of interest 54 as a function of the processing sequence. The coherence technique preferably applied during the process of building the earth model that is usually built up layer by layer from shallow to deep, defining layers with the most significant velocity change. The coherence technique is applied at each layer such as layer 26 and 27 in FIG. 1 or 54 and 55 in FIG. 3. Once a depth migration is performed at each layer, the coherence technique is used to make sure that the faults, such as fault 50, and/or other stratigraphic objectives are focused. In this process, a coherence slice or plot may be produced from the depth migrated gather using 90%, 100%, and 110% of the expected velocity variable in the velocity modeling techniques or other pertinent variables. The coherence slices so produced can be compared to see which value for the velocity variable produces the best definition. Thus, the coherence slices can be viewed to see that the features are well defined at each successive layer. Mathematically, the coherence values at faults will be low.

Other techniques are discussed below that can be used during or after the data processing sequence, with prestacked or poststacked data, and/or during or after building of the earth model. While stacking has been discussed earlier, it will be noted that stacking or full stacking is usually accomplished with all traces in a given volume. If only part of the traces in the selected volume are stacked, this may be referred to as prestacked or partially stacked. If none of the traces are stacked, this may be referred to as prestacked or unstacked. In the prior art, coherence analysis has been performed using stacked data and the advantages in some cases of using unstacked data have not been appreciated.

Figure 4:
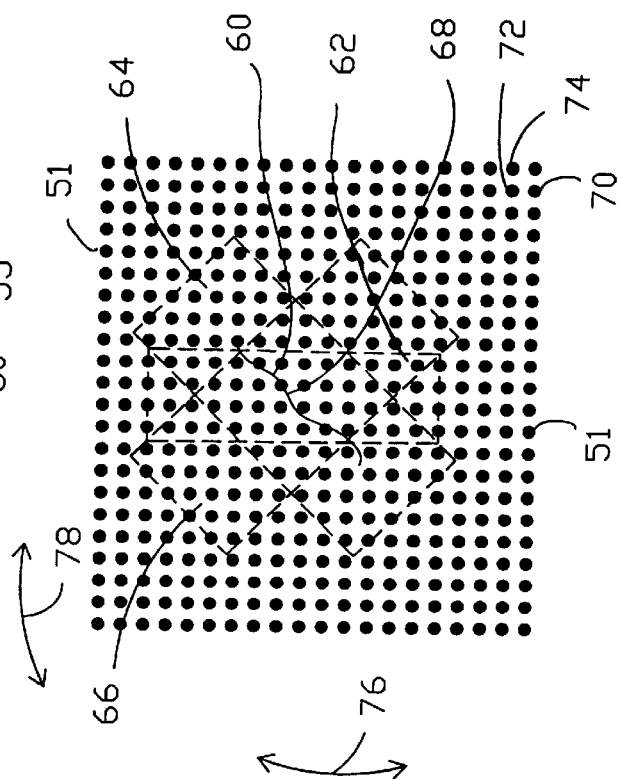
FIG. 4 is a schematical top view of relative azimuthally oriented volumes in the context of receivers of a 3D survey.

In FIG. 4, azimuth ordered gathers, which are preferably prestack gathers, are used to identify subterranean formations including fault/fracture patterns such as fault 60 as shown most conveniently from above. In this embodiment of the invention, 3D seismic datasets are processed through to migration separately wherein each dataset represents a volume that has an azimuthal distribution, such as volumes 62, 64, and 66 shown in FIG. 3. Additional volumes could also be used but it is noted that volumes 62, 64, and 66 are selected for convenience of explanation of the invention only. The size and/or range of azimuth distribution of the volumes selected will typically depend on the acquisition geometry used. Preferably the selected ranges of azimuth would lead to a moderate fold distribution, e.g., greater than 10-fold. Thus each volume is oriented at a different azimuth angle with respect to the other or with respect to a direction such as North. The variable azimuth angle is indicated by arc 76 and 78 that may represent any number of angles and also may represent a range of angles. Each volume defines one or more gathers that each contain a plurality of preferably prestack or unstacked traces. The volumes may represent an angle or a range of azimuth angles with respect to any one portion of fault 60, e.g. center portion 68. The coherence data can then be plotted or analyzed. For the present embodiment, a fault/fracture that appears as a lineation in one azimuth range will tend to disappear in its orthogonal component, e.g., ninety degrees from the starting angle. Thus, this embodiment of the invention is useful for identifying faults or other sharp subterranean features. Interpreters can view the zone of interest in a range of azimuths such as 0–30, 30–60, 90–120, and so forth wherein a coherence slice is taken as desired. Another method may involve automated computational location of faults by selecting areas of low coherence and comparing the same areas with a rotated view to determine if the fault has disappeared. The more promising regions are then made available for the interpreter to review visually as desired.

A simple example of a comparison made with the coherence analysis is suggested very simply in principle only using for example only traces from receivers 70, 72, and 74, where preferably at least three traces are compared to each other preferably in two different directions to thereby produce coherence data or traces. It is not attempted herein to provide a detailed explanation of coherence analysis as taught in the prior art as discussed in U.S. Pat. No. 5,563,949 referred to above. A coherence analysis may be applied to each volume such that the traces produced by receivers, such as receivers 51, are compared to each other.

Figure 5:
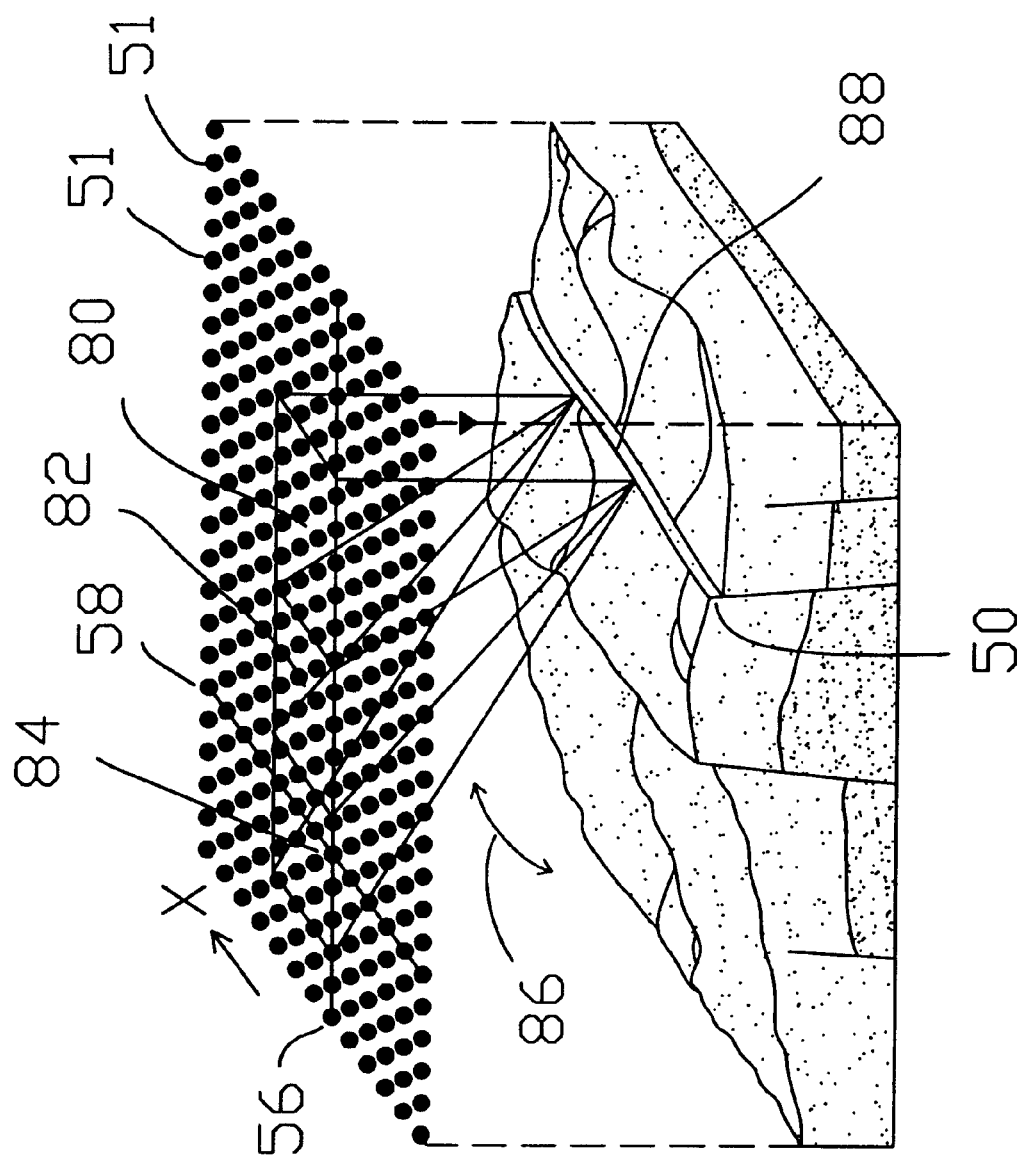
FIG. 5 is a schematical view, in section, of sections of a 3D survey wherein gathers ordered by angle of incidence are disclosed relative to a subterranean location of interest.

In FIG. 5, there is presented another embodiment of the present invention use to form an optimum stack at the horizon of interest. Migrated gathers, preferably prestack time migrated gathers, are divided into angle of incidence gathers such as those gathers indicated by sections or gathers 80, 82, and 84 wherein the relative angles arc indicated by angle of incidence arc 86 with respect to a subterranean location of interest such as horizon of interest 88 that appears to be part of fault 50. These angle of incidence gathers 80, 82, and 84 are used to produce associated angle of incidence coherence data that is then also ordered based on the angle of incidence 86. Acquisition footprint noise may tend to dominate the signals of receivers 51 within low angle gathers which might include gather 80. However, the mid and far ranges as indicated by gathers 82 and 84 hold information pertaining to what constitutes a seismic characteristic at the well. It is known that the theory of AVO suggests that amplitude changes as a function of offsets are linear when plotted against the angle of incidence assuming all other factors are constant. Studies of the angle dependence coherence effects allow the interpreter to gleam the AVO effects using currently available animation techniques with coherence slices viewed as angle of incidence arc 86 is altered. It will be noted that the angles described are very velocity dependent. The reason for this is that all raytracing algorithms use as input a velocity field to compute angle of incidence tables. Using a velocity that is derived from prestack time or depth migration is often preferable to using 3D DMO velocities for complex subterranean structures with non-hyperbolic moveout effects. One use of this technique is to select an optimum stack by determining which information is contaminated, such as by footprint noise, and selecting only that data which includes geological information. This avoids a process of simply stacking curves that may contain significant noise and/or lack of geological data. It may also be possible to select or avoid certain subterranean features that may mask the horizon of interest from one angle but not from a different angle thereby improving the focusing effect with respect to the desired horizon or subterranean feature of interest.

Amplitude is preferably used herein as a function of angle incidence for several reasons. For instance, from Zoeppritz's equation, the $V_p/V_s$ ratio (Poisson's ratio) can be derived and is discussed more hereinafter. The theory behind AVO exploration for gas in clastic rocks is that gas within the pore space of a clastic rock lowers the compressional wave (P-wave) velocity of the rock substantially but leaves the shear wave (S-wave) relatively unaffected. The change in the ratio of P-wave velocity to S-wave velocity causes the partitioning of an incident wave to differ for the case of a gas-sand/shale or gas-sand/wet-sand reflector from that of most other reflectors. For another general reason, since the amplitude is preferably already corrected for change in angle of incidence, changes in coherence effects are due to changes in the formation.

In another embodiment of the present invention, a preferably prestack migrated gather is flattened at the horizon of interest. Flattening means that the curves at the horizon of interest are placed at the same level. For one case discussed previously with respect to FIG. 2, an example of flattening is shown between frames 37 and 39. This process is taken along the entire horizon of interest such as along surface 26 wherein varying uncorrected reflections, such as reflection 34, are shown prior to flattening. Residual NMO corrections are then applied to ensure that the characteristic peak, trough, or zero crossing is flattened accurately at the zone of interest. In section 39, it can be seen that the peaks line up for corrected reflections 40 an 42. The resultant gather is used to produce coherence data so as to form an offset ordered in time around the horizon of interest, i.e., the subterranean location of interest. An instantaneous envelope is computed along common offset planes such as those found in offset cubes. These instantaneous envelope gathers are then divided up into angle gathers and are used to compute P, S, G, and fluid factor, discussed more hereinafter, at the subterranean location of interest. The instantaneous envelope gathers are originally ordered in offset and translated into angle gathers using a velocity field and ray tracing the angles, such as angle of incidence and/or relative azimuth angle, at which they strike the reflector of interest, e.g., subterranean location of interest 54. To compute P, S, G, and fluid factor, data is NMO corrected and sorted into common mid point gathers. P and G are computed at each sample for each common mid point by least square fitting of the following equations:

D=P+G*Sin(theta)**2 over all traces in the common mid point. D is the data value of a trace at time 't'.

theta=atan2(offset, t*vrms). theta is the angle of incidence of a trace at time 't'. Offset is the trace source to receiver distance.

t*vrms is the depth at time 't'. Preferably samples that fall inside incidence angle of 35 degrees are used.

"P" refers to an elastic body wave in which particle motion is in the direction of propagation. This is the type of seismic wave assumed in conventional seismic exploration. The P-wave may also be called the primary wave, compressional wave, longitudinal wave, pressure wave, and the like. "S" refers to an elastic body wave in which particle motion is perpendicular to the direction of propagation. The S-wave may also be called the secondary wave, shear wave, and so forth. S-waves are generated by the incidence of P-waves on interfaces at other than normal incidence, whereupon they are sometimes called converted waves. "G" refers to the rate of change of amplitudes as a function of incidence angles. Fluid factor is a concept introduced some years ago to highlight gas-bearing sandstones. The crossplot of P-wave and S-wave velocity will show that water saturated sandstone, siltstone, and shales fall approximately along the mudrock line. In the absence of carbonates and igneous rocks, high amplitude reflections on fluid factor traces would be expected to represent gas saturated sandstones.

In operation, P, S, G, and fluid factor helps interpreters understand the implication of a high or low amplitude event that may or may not be hydrocarbon-bearing. The behavior of this amplitude when observed as S-wave response, gradient response, and fluid factor response allows one to make a qualitative judgment if the trap has a good possibility of bearing hydrocarbons. Numerous publications indicate that under the proper settings fluid factor can be used to detect gas saturated sandstones. The crossplot of P-wave velocity to S-wave velocity has been used to understand the behavior of rocks when it has no porosity to when it is fully saturated.

The foregoing disclosure and description of the invention is illustrative and explanatory thereof, and it will appreciated by those skilled in the art that various changes in the ordering of steps and ranges of angles and/or offsets, as well as in the details of the illustrations or combinations of features of the method of seismic analysis, may be made without departing from the spirit of the invention.

What is claimed is:

1. A method of seismic analysis for identifying subterranean features, comprising:

obtaining seismic data including data representative of a first subterranean location of interest;

iteratively forming a plurality of migrated gathers related to said first subterranean location of interest such that each of said plurality of migrated gathers varies with respect to a first variable;

producing a respective set of coherence information for each of said plurality of migrated gathers; and comparing said respective set of coherence information of each of said plurality of migrated gathers for determining said first variable.

2. The method of claim 1, wherein said first variable is related to a velocity of a seismic wave.

3. The method of claim 1, further comprising comparing a respective plurality of traces related to said first subterranean location of interest for each of said plurality of migrated gathers to produce said respective set of coherence information.

4. The method of claim 3, further comprising for each of said plurality of traces comparing a plurality of first traces to a plurality of second traces and third traces, said plurality of second traces being positioned in a first direction from said first traces and said plurality of third traces being positioned in a second direction different from said first direction, producing a plurality of coherence traces from said comparison of said plurality of first traces to said plurality of second traces and said plurality of third traces.

5. The method of claim 1, further comprising building an earth model proceeding layer by layer from shallow to deep, said first subterranean location of interest being a shallow layer.

6. The method of claim 1, further comprising selecting a second subterranean location of interest that comprises a deeper layer of said earth model than said first subterranean location of interest.

7. The method of claim 6, further comprising iteratively forming a second plurality of migrated gathers related to said second subterranean location of interest such that each of said second plurality of migrated gathers varies with respect to at least one second velocity variable.

8. The method of claim 7, further comprising:

computing a respective second coherence analysis between a respective plurality of traces of each of said second plurality of migrated gathers; and comparing said respective second coherence analysis between said second plurality of migrated gathers for determining said at least one second velocity variable.

9. The method of claim 8, further comprising selecting a third subterranean location of interest that comprises a deeper layer of said earth model than said second subterranean location of interest.

10. A method of seismic signal analysis for identifying subterranean features, comprising:

obtaining seismic data including data representative of a subterranean location of interest;

obtaining a plurality of gathers such that each of said plurality of gathers includes a respective plurality of traces related to said subterranean location of interest, each of said plurality of gathers being unique in that each of said plurality of gathers includes a combination for said plurality of traces not found in any other of said plurality of gathers, each of said plurality of gathers having an ordered relationship with respect to said subterranean location of interest;

producing a respective set of ordered coherence information from each of said plurality of gathers, each respective set of ordered coherence information having said ordered relationship with respect to said subterranean location of interest; and comparing each said respective set of coherence information for each of said plurality of gathers.

11. The method of claim 10, wherein said plurality of gathers includes prestack data.

12. The method of claim 11, further comprising for each of said plurality of traces comparing a plurality of first traces to a plurality of second traces and third traces, said plurality of second traces being positioned in a first direction from said first traces and said plurality of third traces being positioned in a second direction different from said first direction, producing a plurality of coherence traces from said comparison of said plurality of first traces to said plurality of second traces and said plurality of third traces.

13. The method of claim 10, further comprising optimizing a variable by said comparing said respective set of coherence information for each of said plurality of gathers.

14. The method of claim 10, further comprising:

producing at least one respective coherence plot for each of said plurality of gathers; and comparing said plurality of gathers by reviewing said at least one respective coherence plot for each of said plurality of gathers.

15. The method of claim 10, wherein each of said plurality of traces is indicative of reflective seismic energy.

16. The method of claim 10, further comprising optimizing a selection of a migrated gather from said comparing each said respective set of coherence information for each of said plurality of gathers.

17. A method of seismic analysis for identifying subterranean features, comprising:

obtaining seismic data including data representative of a subterranean location of interest;

obtaining at least one migrated gather related to said subterranean location of interest;

producing a set of coherence information from said at least one migrated gather;

producing a plurality of instantaneous envelope gathers from said set of coherence information; and dividing said instantaneous envelope gathers into instantaneous envelope gathers ordered by their angle with respect to said common subterranean location of interest.

18. The method of claim 17, wherein said step of producing a set of coherence information further comprises producing a plurality of coherence traces.

19. The method of claim 18, further comprising comparing a plurality of migrated gather traces for said at least one migrated gather for producing said respective set of coherence information for each of said plurality of migrated gathers.

20. The method of claim 17, wherein said migrated gather is a prestack migrated gather.

21. The method of claim 17, wherein said migrated gather is flattened at the subterranean location of interest.

22. The method of claim 17, further comprising applying residual normal moveout corrections to said migrated gather to ensure that a characteristic peak, trough, or zero crossing is flattened accurately at said subterranean location of interest.

23. The method of claim 17, wherein said computing of instantaneous envelope is made along common offset planes.

24. The method of claim 17, further comprising computing at least one of either compressional wave, shear wave, rate of change of amplitude, or fluid factor from said instantaneous envelop gathers ordered by angle as said subterranean location of interest.

25. A method of seismic analysis for identifying subterranean features, comprising:
    obtaining seismic data including data representative of a subterranean location of interest;
    producing a plurality of azimuth ordered gathers with respect to said subterranean location of interest such that said plurality of gathers is representative of a respective plurality of volumes ordered in azimuthal distribution with respect to said subterranean location of interest, each plurality of azimuth gathers including a respective plurality of traces;
    producing a respective set of azimuth ordered coherence information for each of said plurality of azimuth ordered gathers; and
    comparing said respective plurality of coherence information for each of said plurality of azimuth ordered gathers.

26. The method of claim 25, further comprising:
    plotting said respective set of azimuth ordered coherence information for each of said plurality of azimuth ordered gathers to produce azimuth ordered coherence plots; and
    comparing said azimuth ordered coherence plots.

27. The method of claim 26, further comprising:
    locating a subterranean structure from one set of azimuth ordered coherence information having a first azimuth; and
    comparing said subterranean structure with a second set of azimuth ordered coherence information.

28. The method of claim 27, further comprising selecting said second set of azimuth-ordered coherence information to have a second azimuth in a range of azimuth angles including an azimuth angle at an approximate right angle with respect to said first azimuth.

29. The method of claim 25, further comprising:
    locating a subterranean structure from one set of azimuth-ordered coherence information having a first range of azimuths; and
    comparing said subterranean structure with a second set of azimuth-ordered coherence information having a second range of azimuths.

30. The method of claim 25, wherein said step of producing a respective set of azimuth-ordered coherence information further comprises comparing said respective plurality of traces for each of said plurality of azimuth-ordered gathers.

31. The method of claim 11, further comprising for each of said respective plurality of traces comparing a plurality of first traces to a plurality of second traces and third traces, said plurality of second traces being positioned in a first direction from said first traces and said plurality of third traces being positioned in a second direction different from said first direction, producing a plurality of coherence traces from said comparison of said plurality of first traces to said plurality of second traces and said plurality of third traces.

32. A method of seismic analysis for identifying subterranean features, comprising:
    obtaining 3D seismic data including data representative of a subterranean location of interest;
    obtaining a plurality of migrated gathers from said 3D seismic data;
    dividing said migrated gathers into a plurality of angle of incidence gathers such that said angle of incidence gathers are ordered with respect to an angle of incidence with said subterranean location of interest, each of said plurality of angle of incidence gathers including a respective plurality of traces;
    producing a respective set of angle of incidence ordered coherence information for each of said plurality of angle of incidence gathers; and
    comparing said respective sets of angle of incidence ordered coherence information for each of said plurality of angle of incidence gathers.

33. The method of claim 32, wherein said migrated gathers are prestack time migrated gathers.

34. The method of claim 32, further comprising:
    plotting said respective set of angle of incidence ordered coherence information for each of said plurality of angle of incidence gathers to produce angle of incidence ordered coherence plots; and
    comparing said angle of incidence ordered coherence plots.

35. The method of claim 10, wherein said step of producing further comprises comparing said respective plurality of traces for each of said plurality of angle of incidence gathers for producing said respective set of angle of incidence ordered coherence information for each of said plurality of angle of incidence ordered gathers.

36. The method of claim 35, further comprising for each of said respective plurality of traces comparing a plurality of first traces to a plurality of second traces and third traces, said plurality of second traces being positioned in a first direction from said first traces and said plurality of third traces being positioned in a second direction different from said first direction, producing a plurality of coherence traces from said comparison of said plurality of first traces to said plurality of second traces and said plurality of third traces.

37. A method of seismic analysis for identifying subterranean features, comprising:
    obtaining 3D seismic data including data representative of a common subterranean location of interest;
    selectively producing a plurality of wavelet shaped gathers related to said common subterranean location of interest;
    determining a respective set of wavelet-shaped coherence information for each of said plurality of wavelet-shaped gathers; and comparing said respective sets of wavelet-shaped coherence information for selecting an optimal wavelet-shaped gather from said plurality of wavelet-shaped gathers.

38. The method of claim 37, further comprising:

selectively producing a plurality of geometry assigned gathers related to said common subterranean location of interest; and determining a respective set of geometry assignment coherence information for each of said plurality of geometry assigned gathers.

39. The method of claim 38, further comprising comparing said respective sets of geometry assignment coherence information for selecting an optimal geometry assigned gather from said plurality of geometry assigned gathers.

40. The method of claim 37, further comprising:

selectively producing a plurality of migrated gathers related to said common subterranean location of interest that vary with respect to a velocity variable; and determining a respective set of migrated coherence information for each of said plurality of migrated gathers.

41. The method of claim 40, further comprising comparing each of said respective sets of migrated coherence information for determining an optimal velocity for said velocity variable.

42. A method of seismic analysis for identifying subterranean features, comprising:

obtaining 3D seismic data including data representative of a common subterranean location of interest;

selectively producing a plurality of geometry assigned gathers related to said common subterranean location of interest;

determining a respective set of geometry assignment coherence information for each of said plurality of geometry assigned gather; and comparing said respective sets of geometry assignment coherence information for selecting an optimal geometry assigned gather from said plurality of geometry assigned gathers.

43. The method of claim 42, further comprising:

selectively producing a plurality of wavelet-shaped gathers related to said common subterranean location of interest; and determining a respective set of wavelet-shaped coherence information for each of said plurality of wavelet-shaped gathers.

44. The method of claim 43, further comprising comparing said respective sets of wavelet-shaped coherence information for selecting an optimal wavelet-shaped gather from said plurality of wavelet-shaped gathers.

45. The method of claim 42, further comprising:

selectively producing a plurality of migrated gathers related to said common subterranean location of interest that vary with respect to a velocity variable; and determining a respective set of migrated coherence information for each of said plurality of migrated gathers.

46. The method of claim 45, further comprising comparing each of said respective sets of migrated coherence information for determining an optimal velocity for said velocity variable.

* * * * *